United States Patent
Horie et al.

(10) Patent No.: US 7,177,531 B2
(45) Date of Patent: Feb. 13, 2007

(54) RECORD AND PLAYBACK APPARATUS AND RECORD MEDIUM

(75) Inventors: Masahiro Horie, Yamaguchi-ken (JP); Masako Ninomiya, Hiroshima-ken (JP); Ryuichi Hori, Hiroshima-ken (JP); Shuji Okamoto, Hiroshima-ken (JP); Atsushi Hashimoto, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1208 days.

(21) Appl. No.: 10/001,195

(22) Filed: Dec. 4, 2001

(65) Prior Publication Data

US 2002/0094191 A1 Jul. 18, 2002

(30) Foreign Application Priority Data

Dec. 5, 2000 (JP) .............................. 2000-369521

(51) Int. Cl.
*H04N 5/00* (2006.01)
(52) U.S. Cl. ...................................................... 386/126
(58) Field of Classification Search .................... 386/1, 386/4, 45, 46, 52, 55, 64, 111, 125, 126; 360/7, 360/13; 725/14.05
See application file for complete search history.

(56) References Cited

U.S. PATENT DOCUMENTS

| | | | |
|---|---|---|---|
| 5,546,191 A | 8/1996 | Hibi et al. | |
| 5,697,885 A | 12/1997 | Konomura et al. | |
| 5,930,446 A * | 7/1999 | Kanda .......................... | 386/52 |
| 6,192,183 B1 * | 2/2001 | Taniguchi et al. ............ | 386/52 |
| 6,263,152 B1 | 7/2001 | Hisatomi et al. | |
| 6,366,296 B1 * | 4/2002 | Boreczky et al. ........... | 715/719 |
| 6,385,386 B1 * | 5/2002 | Aotake ......................... | 386/68 |
| 6,476,825 B1 * | 11/2002 | Croy et al. ................. | 715/716 |
| 6,778,223 B2 * | 8/2004 | Abe ............................ | 348/559 |

FOREIGN PATENT DOCUMENTS

| | | |
|---|---|---|
| EP | 0 762 756 A2 | 3/1997 |
| JP | 02-259880 | 10/1990 |
| JP | 05-244520 | * 9/1993 |
| JP | 07-336630 | 12/1995 |
| JP | 8-121989 | 5/1996 |
| JP | 08-138318 | 5/1996 |
| JP | 08-182006 | 7/1996 |
| JP | 8-223524 A | 8/1996 |

(Continued)

*Primary Examiner*—Thai Q. Tran
*Assistant Examiner*—Mishawn Dunn
(74) *Attorney, Agent, or Firm*—McDermott Will & Emery LLP

(57) ABSTRACT

The present invention provides a record and playback apparatus including: a quantitative display unit of visually quantitative displaying a record time of a record-completed image recorded in the storage medium and the remaining recordable time; a record indicator control unit of displaying at least one of a playback position in the quantitative display of an in-playing back image or a record position in the quantitative display of an in-recording image; and an indicator selection and execution unit of selecting at least one of the playback indicator, the record indicator and the quantitative display each of which is a display object, and of executing a predetermined process based on a predetermined command to be inputted and the display object to be selected, and a record medium.

11 Claims, 10 Drawing Sheets

FOREIGN PATENT DOCUMENTS

| | | |
|---|---|---|
| JP | 09-065225 | 3/1997 |
| JP | 10-108124 A | 4/1998 |
| JP | 08-223524 | 8/1998 |
| JP | 10-276388 | 10/1998 |
| JP | 10-304313 | 11/1998 |
| JP | 11-039850 | 2/1999 |
| JP | 11-213628 | 8/1999 |
| JP | 11-297051 | 10/1999 |
| JP | 11-297051 A | 10/1999 |
| JP | 3001102 | 11/1999 |
| JP | 3107063 | 9/2000 |
| WO | WO 99/38168 | 7/1999 |

* cited by examiner

FIG. 8

SELECTIVE EXECUTION TABLE

| FOCUS POSITION | INPUT | | | |
|---|---|---|---|---|
| | PLAYBACK | STOP | EDIT | CURSOR |
| PLAYBACK INDICATOR | PERFORM PLAYBACK OF IMAGE AT PLAYBACK INDICATOR POSITION | STOP PLAYBACK | EDIT IMAGE AT PLAYBACK INDICATOR POSITION | SHIFT PLAYBACK INDICATOR POSITION |
| RECORDING INDICATOR | PERFORM PLAYBACK FROM TOP OF IN-RECORDING IMAGE | STOP RECORDING | EDIT IMAGE AT RECORDING-INDICATOR POSITION | SHIFT RECORDING-INDICATOR POSITION |
| JUMP INDICATOR | PERFORM PLAYBACK FROM JUMP-INDICATOR POSITION | INVALID | EDIT IMAGE AT JUMP-INDICATOR POSITION | SHIFT JUMP-INDICATOR POSITION |
| STILL IMAGE 210 | PERFORM PLAYBACK FROM POSITION OF STILL IMAGE 210 | INVALID | INVALID | INVALID |
| STILL IMAGE 211 | PERFORM PLAYBACK FROM POSITION OF STILL IMAGE 211 | INVALID | INVALID | INVALID |
| ... | ... | ... | ... | ... |

RECORD AND PLAYBACK APPARATUS AND RECORD MEDIUM

BACKGROUND OF THE INVENTION

1. Field of the Invention

The present invention relates to a record and playback apparatus, a program, and record medium, and more particularly relates to a record and playback apparatus for recording and playing back an image by using a storage medium capable of random accessing, a program therefor, and a record medium therefor.

2. Prior Art of the Invention

Conventionally, a videotape is widely used as media for recording/playing back images of TV broadcasts and the like. However, due to the inherent structure of the videotape, the videotape cannot simultaneously perform record and playback, and also cannot instantaneously play back an intended record-completed image (broadcast).

Recently, in place of the above-mentioned videotape, recording media such as a hard disk (HD) and a DVD (digital versatile disc) that can be randomly accessed are used as media utilizing for record/playback of images of TV broadcasts and the like.

By utilizing the above-mentioned recording media capable of random accessing, various functions that cannot be implemented with the conventional videotape are added to a record and playback apparatus, which records and plays back images of TV broadcasts and the like.

An example of the above-mentioned functions includes a time slip playback function. The time slip playback function is a function capable of performing playback of a in-recording image while performing record that cannot be achieved with the conventional record and playback apparatus, and capable of performing playback of another record-completed image while performing record.

In the time slip playback function, in a case of performing playback of a record-completed image during recording an image, and user performs, for example, the following operation. That is, the record-completed image to be played back and the in-recording image are displayed together in alignment on a TV screen, the image (record-completed image) to be played back is forwarded (corresponding to a fast forward operation performed with the conventional videotape) and/or reversed (corresponding to a rewind operation performed with the conventional videotape) to determine a desired playback position, and then the record-completed image is displayed at the playback position by using a central portion of the TV screen.

In a case of viewing an already recorded portion of a in-recording image, the user displays the top of the record-completed image and the in-recording image together in alignment on a TV screen and selects the top of the image, thereby displaying the record-completed image at a central portion of the TV screen.

The above are representative functions added for the utilization of the storage medium capable of random accessing and an operation method corresponding to the additional functions.

While no countermeasure can be taken due to the inherent property of the videotape, with the conventional videotape, the display of image information recorded in the videotape has been insufficient.

For this reason, Japanese Patent Publication No. 3107063 discloses a technique of displaying image information recorded in the storage medium capable of random accessing, for example.

According to the technique disclosed in the above-mentioned Japanese Patent Publication No. 3107063, scheduled record time for a in-recording image and completed record time are displayed in an overlapped state, and a pointer indicating the playback position is displayed on the displayed portion. This enables a user to recognize the scheduled record time, the record-completed time, and the playback position.

As described above, since the storage medium has become capable of meeting various functional requirements, various new functions are added to the record and playback apparatus. With the advent of many complicated functions added, a user is compelled to learn complicated operations to use the functions. For example, as described above, to shift between an in-recording image and a record-completed image, the record-completed image and the in-recording image need to be displayed together in alignment, and a desired image needs to be selected from the displayed images. As a matter of course, in a case of selecting a playback-desired image from a plurality of record-completed images, the plurality of record-completed images need to be displayed. In addition, even after a record-completed image has been selected, complicated forward/reverse operations need to be carried out, when the user want to playback from a halfway portion thereof. As such, there occur demands for the development of an interface that enables a user to sufficiently use the above-mentioned functions and that does not require the user to learn how to use the above-mentioned complicated operations. That is, the development of an interface having a user-friendly operability is demanded.

In addition, with the conventional videotape, since the recordable time is relatively short, the videotape needs to be replaced; that is, a user judges the difference of the images according to the kind of videotapes. However, with the advent of a mass-capacity storage medium, the replacement of the medium is not required, many images can be recorded in one storage medium. As such, management for the images is needed with in one storage medium.

In the technique disclosed in the above-mentioned Japanese Patent Publication No. 3107063, while a user can easily recognize the scheduled recording time, the completed record time, and the playback position, the user cannot recognize information related to a plurality of images recorded in one storage medium. Specifically, the disclosed technique exhibits problems in easily and firmly recognizing, for example, the information related to the type and number of images recorded in the storage medium, the information related to the remaining recordable time, and the information related to the recording capacity used by the type of image for the storage medium. In addition, while only the display function for information related to an image is provided, management function for the image is not disclosed at all in the above-mentioned publication.

In particular, in recent years, the recordable capacity of the hard disk, DVD or the like has increased rapidly, resulting in that the image-recordable time thereof significantly exceeds that of the above-mentioned videotape; and the recordable time can be expected to further increase in the future. As such, early provision is demanded for a technique of managing individual record-completed images in one storage medium.

SUMMARY OF THE INVENTION

Accordingly, an object of the present invention is to provide a display of sufficient information and easy operation for a user by visually and comprehensively displaying information recorded in a storage medium and by utilizing the display to receive an input from the user. And another object of the present invention is to provide a record and playback apparatus capable of performing switch between a record-completed image and an in-recording image without switching a screen and simultaneously capable of performing switch of the record-completed image with simple operation at a time of time slip playback.

The present invention is provided with the following units in order to achieve the above-described objects.

That is, it is assumed a record and playback apparatus using a medium capable of random accessing to perform record and playback of an image. A quantitative display unit provided in the record and playback apparatus visually displays a record time of the record-completed image recorded in the medium and the remaining recordable time, and an indicator control unit displays at least one of a playback position in the quantitative display of a in-playing back image or a recording position in the quantitative display of the in-recording image.

In addition, an indicator selection and execution unit selects at least one of a playback indicator, a record indicator and a quantitative display each of which is a display object, and executes a specific process based on a predetermined command inputted by the user and the selected display object.

Accordingly, the user can instantaneously and visually recognize the number of images already recorded on the storage medium, a playback time, and the remaining recordable time by viewing the quantitative display (scale). In addition, commands can be visually and directly inputted with respect to the display objects such as the scale (quantitative display), the playback indicator and the record indicator, so that the selection of the desired playback image and playback position can be instantaneously performed, thereby providing an user interface having higher operation.

In addition, the record and playback apparatus according to present invention further includes an image display unit of displaying a still image of the record-completed image. The still image displayed by the image display unit is an image at the time of switching an audio mode in the record-completed image, an image at the time of a change in scene in the record-completed image, or an image of a preset scene in the record-completed image.

With the above-described constitution, a characteristic still image representing the corresponding record-completed image can be displayed. This enables the selection of an image position having a high probability at which the user has an interest (the user is desirous of viewing), thereby enabling a user operation to be improved.

Moreover, the present invention may have the constitution arranged to further include an end indicator control unit of displaying an end prospected position in the quantitative display of the in-recording image.

With the above-described constitution, the user can instantaneously recognize information regarding the recording-progressed extent as well as a time (minutes, for example) required for the end of recording a remaining image portion. Moreover, displaying the end indicator enables the user to easily know a remaining video-recordable time.

Furthermore, the present invention may have the constitution arranged such that the indicator control unit controls a time interval to be displayed for the position of the record indicator and for the position of the playback indicator. And the constitution arranged such that the time interval is a time necessary for the playback indicator to catch up with the record indicator.

With the above-described constitutions, the user can recognize a precise time necessary for the playback indicator to catch up with the record indicator.

Still furthermore, the present invention may have the constitution arranged such that the quantitative display unit causes the quantitative display for the record-completed image to be presented according to one of a playback time, a record capacity, and a record site of the record-completed image, and the constitution arranged such that switching can be performed among the quantitative displays of three types.

With the above-described constitutions, the user can select an appropriate one of the displays for an intended operation; that is, information necessary for an operation desired by the user can be provided.

Still furthermore, the present invention may have the constitution arranged to further include a jump indicator control unit for displaying a jump indicator for indicating that a predetermined position of the record-completed image is selected in the quantitative display in addition to the playback indicator, wherein the jump indicator is used as the display object that is a process target of the indicator selection and execution unit.

With the above-described constitution, an image corresponding to a position indicated by the jump indicator is displayed at a position that is different from a display position corresponding to the playback indicator. This enables the user to select a different image with the in-playing back image being kept as it is.

Still furthermore, the present invention may have the constitution arranged such that the jump indicator automatically moves and interlocks at one of the playback indicator and the record indicator.

With the above-described constitution, for example, when the user wants to re-view the same scene, the user can instantaneously perform playback of the desired image by selecting the jump indicator.

BRIEF DESCRIPTION OF THE DRAWINGS

FIG. 8 is an imaginary view of a selective execution table;

DESCRIPTION OF THE PREFERRED EMBODIMENTS

Hereinbelow, embodiments of the present invention will be described with reference to the accompanying drawings for understanding of the present invention. The embodiments described below are merely illustrative of practical examples of the present invention, and do not limit the technical scope of the present invention. And, in the following embodiments, any image data to be an object of the processing will be called an "image" like the image displayed on the display.

First Embodiment

Figure 1:
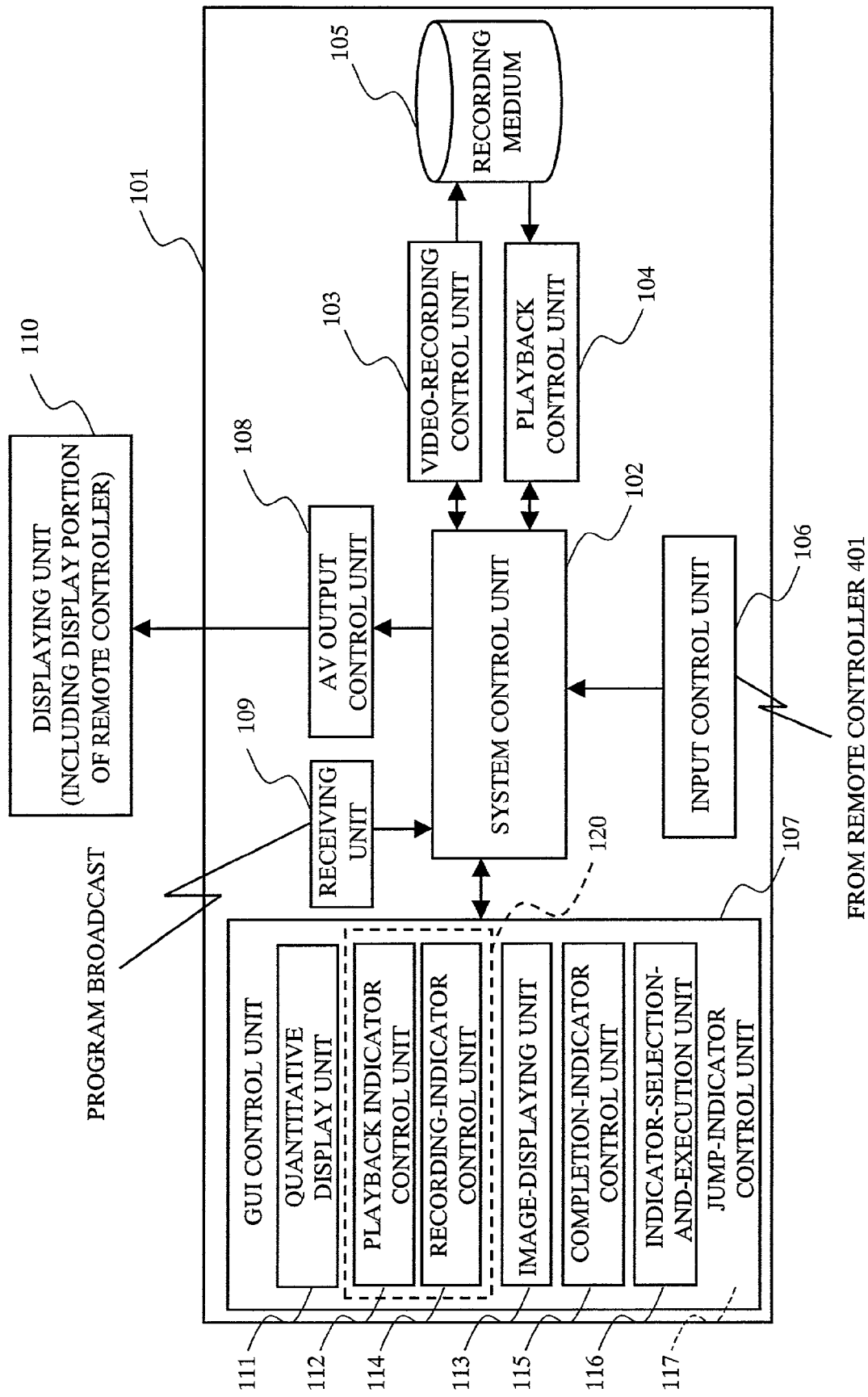
FIG. 1 is a hardware block diagram schematically showing a record and playback apparatus according to the present invention.
Figure 4:
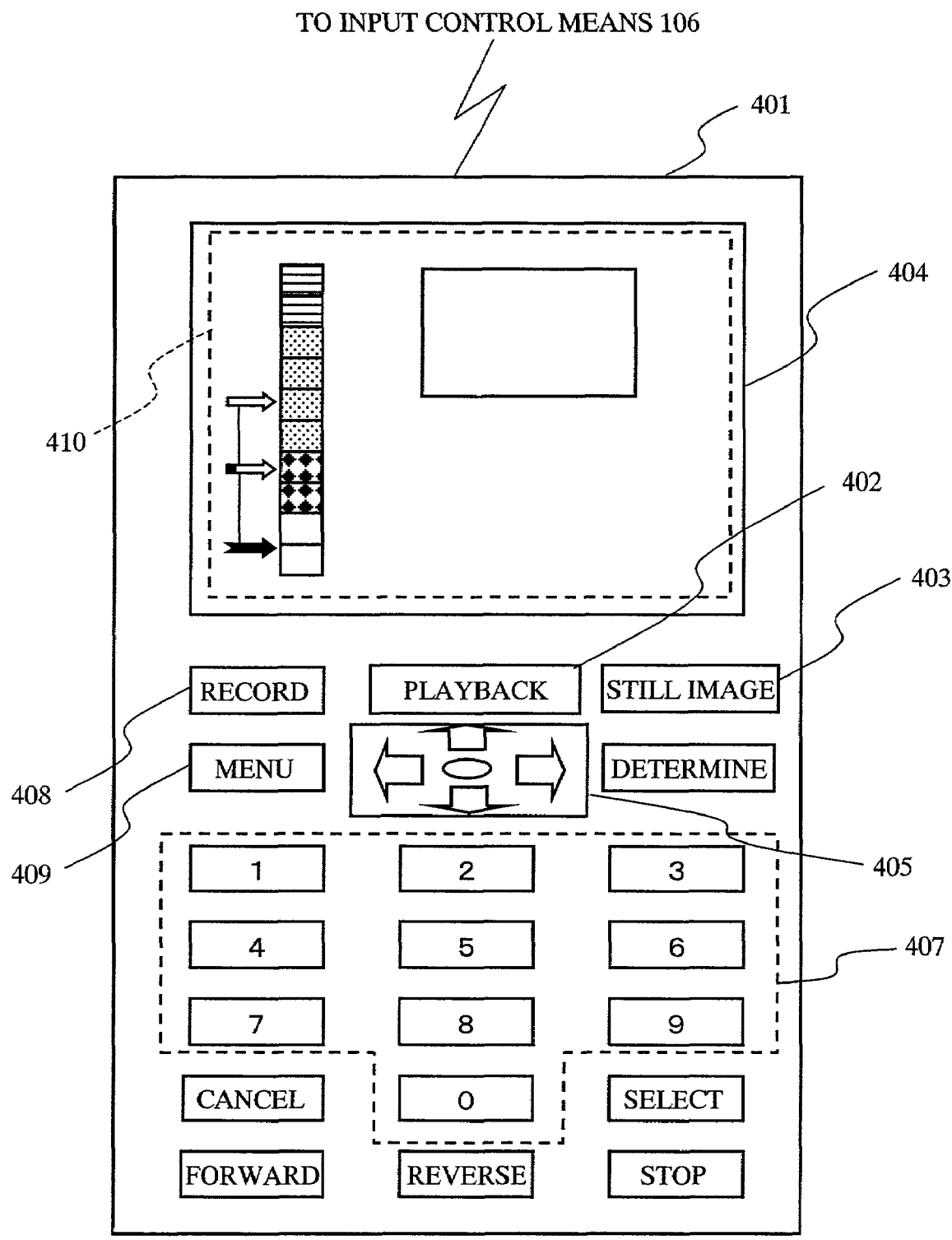
FIG. 4 shows an example of a remote controller.

First, referring to FIGS. 1 and 4, a record and playback apparatus according to a first embodiment will be schematically described. FIG. 4 shows an example remote controller.

A record and playback apparatus 101 is configured to include a system control unit 102, a video-recording control unit 103, a playback control unit 104, a storage medium 105, an input control unit 106, a GUI control unit 107, an AV output control unit 108, and a reception unit 109. The record and playback apparatus 101 practically represents, for example, a digital video recorder or a DVD recorder. The storage medium 105 practically represents a random-accessible medium, such as a hard disk or a DVD (for example, a DVD-RAM or a DVD-RW), and it need not be removable. The reception unit 109 practically represents a tuner that can receive, for example, program broadcasts that are provided via cable-broadcasting or radiobroadcasting. However, the reception unit 109 need not be of the type of receiving program broadcasts, and may instead be of a type of storing (recording) images recorded by a home-use digital video recorder or the like onto the above-mentioned storage medium 105. A display unit 110 is practically represents a display device of, for example, a TV set a remote controller 401; and a displaying method thereof is not specifically limited. Hereinbelow, the word "image" refers to a program-broadcast image or the other kind of images including a motion images.

Each of the unit stored in the record and playback apparatus 101 is provided in the form of hardware or software.

Hereinbelow, a description will be made regarding basic input/output operations to be performed with the system of the record and playback apparatus 101. A command entered by a user for the record and playback apparatus 101 is first accepted by the input control unit 106 and is then sent to the system control unit 102. For example, when the command from the user is a video-record command for recording a selected program broadcast (image), the program broadcast (image) selected by the user is received by the reception unit 109, and the image is then sent to the system control unit 102. Subsequently, the system control unit 102 sends the image to the video-recording control unit 103, and the video-recording control unit 103 records the image onto the storage medium 105. In this way, the predetermined image is recorded (video-recorded) onto the storage medium 105. The above-mentioned input operation is performed by the user through a device such as the remote controller 401.

Subsequently, when the user issues a playback command for playing back an image by using a device such as the remote controller 401 to the input control unit 106, the playback command is sent to the system control unit 102 and is further sent to the playback control unit 104. The playback control unit 104 sends information related to the image recorded on the storage medium 105 to the system control unit 102. The above-mentioned image-related information includes, for example, a broadcast name, record date and time, and a playback time, which is used for image identification.

Upon receipt of the above-described image-related information, the system control unit 102 sends the image-related information to the AV output control unit 108. The AV output control unit 108 converts the image-related information into a format corresponding to the display unit 110, and then sends the image-related information to the display unit 110.

Upon receipt of the image-related information, the display unit 110 displays the image-related information on a display such as a CRT (cathode ray tube) or a display portion 404 of the remote controller 401. Thereby, the image-related information is reported to the above-mentioned user.

Subsequently, the user confirms the image-related information, and selects a desired image by using the remote controller 401. Then, the selected information is sent to the playback control unit 104 via the input control unit 106 and the system control unit 102. Upon receipt of the selected information, the playback control unit 104 reads out an image corresponding to the selected information from the storage medium 105, and then sends the image to the AV output control unit 108 via the system control unit 102. The AV output control unit 108 outputs the received image to the display unit 110. In this way, the image selected by the user is displayed on the display.

In the first embodiment, the basic input/output operations for the record and playback apparatus 101 are performed as described above. The GUI control unit 107 executes various other control processes for the inputs of the user.

Figure 2:
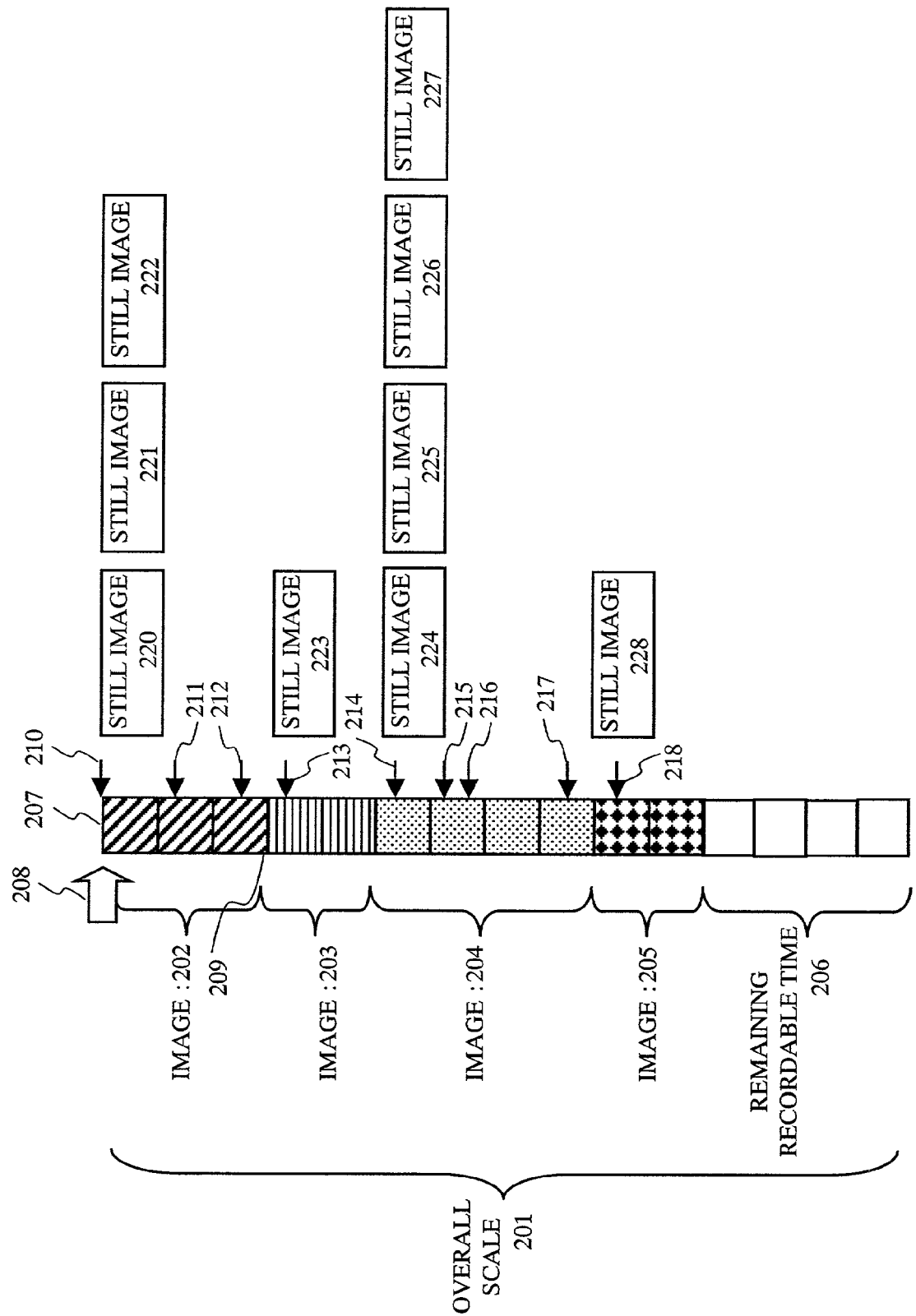
FIG. 2 shows an example of a quantitative display displayed by the record and playback apparatus according to the present invention.
Figure 3:
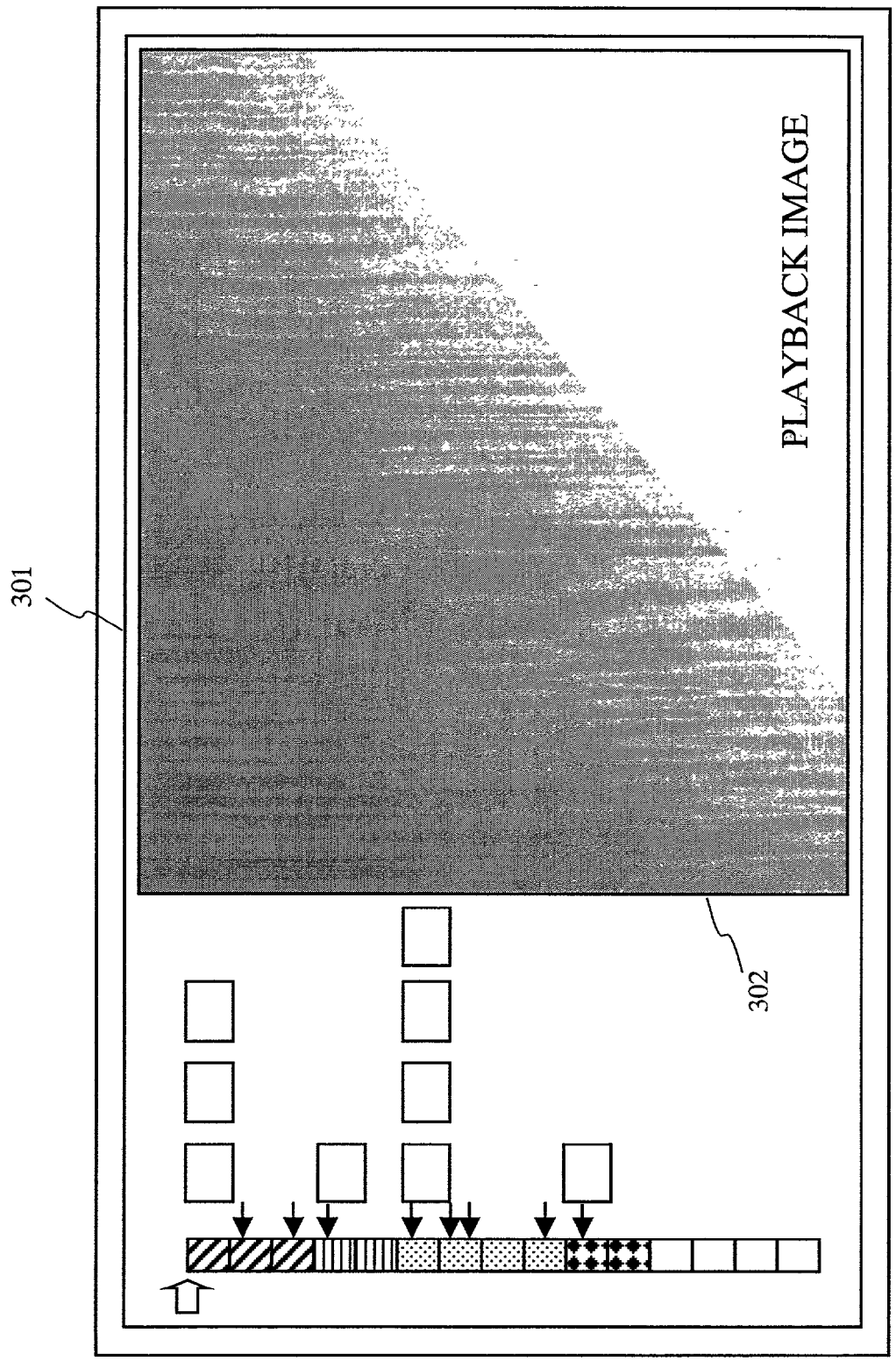
FIG. 3 shows an example that a display object is displayed on a display.
Figure 5:
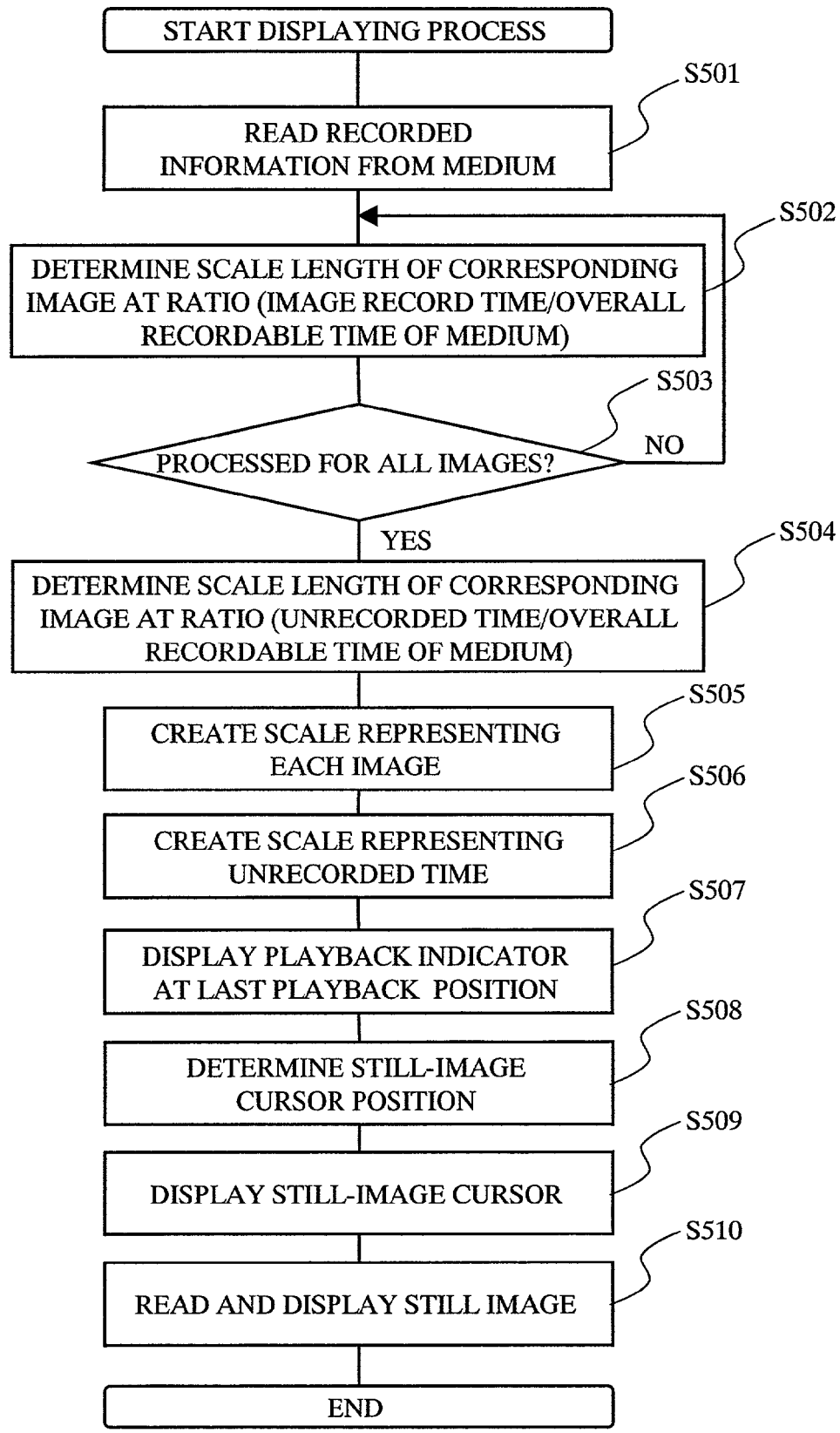
FIG. 5 is a flow chart showing processes at playing back in a GUI control unit.

Hereinbelow, processes executed by the GUI control unit 107 will be described in detail with reference to FIGS. 1 to 5 and 9. FIG. 2 shows example display objects presented on, for example, the display unit 110 (including the display portion 404 of the remote controller 401) according to the GUI control unit 107. FIG. 3 shows an image in which the above-mentioned display objects are presented on the display. FIG. 5 shows a flowchart of processes to be executed in the GUI control unit.

Hereinbelow, the image selection performed by the user and a playback method in image playback will be described.

First, the user depresses, for example, a predetermined button on the remote controller 401 shown in FIG. 4. Thereby, the user sends to the input control unit 106 a content-display request for displaying the contents (information) of an image recorded on the storage medium 105. The system control unit 102 receives the content display request via the input control unit 106, and sends the content display request to the GUI control unit 107.

Subsequently, a quantitative display unit 111 that constitutes the GUI control unit 107 receives the content display request, and then reads recorded information from the storage medium 105 via the system control unit 102 and the playback control unit 104 (S501 in FIG. 5). The above-mentioned recorded information includes, for example, the number of record-completed images, record times of the individual record-completed images, and overall recordable time of the medium. Based on the recorded information, the quantitative display unit 111 performs a calculation of the expression (image record time/media overall recordable time) (S502 in FIG. 5). Specifically, for example, "0.2" is produced in a case where the overall recordable time is 5 hours and the image record time is 1 hour. The produced value represents the length of the scale of the record-completed image with respect to an overall scale 201 assumed to be "1". The length (ratio) of the overall scale 201 in actual display depends on factors, such as the display position. The scale represents a record time of each image and a remaining recordable time of the medium that are visually represented in the form of a quantitative display. For example, the display area of each scale represents, the size of the scale, the capacity, and the time, etc. Practically, the scale is presented in the form of, for example, a graphic display.

After the calculation of the ratio to the overall scale 201 of the corresponding image, a determination is made as to whether the above-described calculation is performed for all of the images. If the process is not yet executed for all of the images, the calculation process is iterated for each of the remaining images (S503 "NO" to S502 in FIG. 5).

When the calculation has been performed for all of the record-completed images, a process of a calculation of the expression (unrecorded time/overall recordable time of the medium) is subsequently performed. The process is executed to determine the length of the scale of the remaining recordable time of the medium 105 (S503 "YES" to S504 in FIG. 5). However, a case can be considered to occur in which the above-mentioned unrecorded time varies depending on the video-recording mode of an image, i.e., whether the mode is set to high-quality video recording or low-quality video recording. In this example case, the arrangement is made to allow the video-recording mode to be arbitrarily set to, for example, a currently set video-recording mode of an image or the same video-recording mode as that of an image previously recorded. In this case, when the above-described process of the quantitative display is to be performed during video-recording, the unrecorded time is preferably calculated using a currently set video-recording mode, as described below.

After the determination of the time (ratio) of each of the images with respect to the overall scale 201 and the time (ratio) of the unrecorded time with respect to the overall scale 201, processing proceeds to steps of creating a scale representing the time of each images and a scale representing the unrecorded time according to the result of the above-described determination (S505 to S506 in FIG. 5).

The created scale is displayed in a predetermined field of the display unit 110 via the system control unit 102 and the AV output control unit 108. The scale for each of the images can be displayed in a unique form using a specific pattern, a specific color, and the like so as to easily be identified by the user.

Examples of the scales are shown in FIG. 2. The overall scale 201 shown in FIG. 2 is created for a case where, for example, the recording capacity of the storage medium 105 is sufficient to record a 5-hour image(s) in a standard mode, and each of images 202 to 205 represents a scale of an image stored in the storage medium 105 on the basis of the record time (playback time) of the image. For example, suppose one rectangular block 207 represents 20 minutes. In this case, the image 203 represents a playback time of 40 minutes, the image 204 represents a playback time of 80 minutes, and the image 205 represents a playback time of 40 minutes. However, as described above, a case can occur where the video-recording mode is different. For example, in a case where the image 203 is recorded using a recording capacity that is twice as large as that for the image 204 (in this case, the quality of the image 203 is generally higher than that of the image 204), the recording capacities used for the individual images 203 and 204 are made to be the same in the practical storage medium 105.

In addition to the scales of the above-mentioned individual images, a remaining recordable time 206 is displayed in the form of a scale. In the present example, when all the images are assumed to have been recorded in the same video-recording mode, the remaining recordable time 206 is formed of four rectangular blocks; that is, it represents 80 minutes.

As described above, since the scale of each of the images is created using the playback time, the user can instantaneously visually recognize the playback time for each of the images upon seeing the scale. Although the remaining recordable time 206 is also displayed, it need not be displayed when a command irrelevant to video-recording is input. For example, the remaining recordable time 206 need not be displayed when a PLAYBACK 402 is depressed.

After the quantitative display unit 111 displays the above-mentioned scales via the AV output control unit 108, a playback indicator control unit 112 constituting an indicator control unit 120 controls a playback indicator 208 to be displayed in the position of the previously played back image at the above-mentioned indicator (S507 in FIG. 5). In a similar manner for the scale, the playback indicator 208 is displayed on the display unit 110 via the system control unit 102 and the AV output control unit 108. In this case, the position of the previously played back image is assumed to be stored in a storage area (not shown) of the GUI control unit 107. However, when no record of a previously played back image is detected, the playback indicator 208 is displayed at, for example, the top of a first image 202 (such as an image corresponding to the oldest record) (S507 in FIG. 5).

After the playback indicator 208 has been displayed by the playback indicator control unit 112, an image-display unit 113 constituting the GUI control unit 107 controls still-image cursors 210 to 218 to be displayed on predetermined positions corresponding to the individual images 202 to 205 at the above-described scales (S508 and S509 in FIG. 5). In a similar manner for either the scale or the playback indicator 208, the still-image cursors 210 to 218 are displayed on the display unit 110 via the system control unit 102 and the AV output control unit 108. The display positions (indicating the positions at the individual images 202 to 205) of the still-image cursors 210 to 218 are determined by the image-display unit 113, as described below in detail.

Subsequently, the image-display unit 113 reads out individual images 220 to 228 (still images (thumbnails)) corresponding to the individual still-image cursors 210 to 218 from the storage medium 105 via the system control unit 102 and the playback control unit 104.

The images 220 to 228 that have been read out are individually displayed on positions corresponding to the still-image cursors 210 to 218 (S510 in FIG. 5). In FIG. 2, the still-image cursors 210 to 218 correspond to the images 220 to 228, respectively. Although FIG. 2 shows the still images horizontally arranged, each of them may be displayed just beside the corresponding still-image cursor. In addition, the arrangement may be made such that a still image is displayed in an upper portion of the scale display field as a predetermined field 903 (subscreen) of a display 301 shown in FIG. 9. In this case, a specific still-image cursor 904 is selected to change the still image displayed on the predetermined field 903 to a still image corresponding to the selected still-image cursor 904. According to the above arrangement, display objects can be presented to the user without impaction caused by the displayed object to a field 302 on which reproduced images are displayed.

In this manner, the scale is displayed, and the playback indicator 208 is displayed at the position corresponding to the scale; and in addition, the still-image cursors and the still images are displayed. This enables the user to instantaneously visually (perceptively) recognize the number of images already recorded onto the storage medium, the remaining recordable time, and the position of previously played back image. In addition, since the still-image cursors and the still images are displayed at the positions corresponding to the individual images (scales), the user can easily recognize the scene in a predetermined position of each of the images. Moreover, an indicator selection and execution unit described below enables the user to pointout the position, such as the interrupted position of the previously played back image or the position displayed in the still image, and to play back the image from the position.

Hereinbelow, a description will be made regarding a determination method carried out by the image-display unit 113 for the positions of the still-image cursors 210 to 218 of the record-completed images (images 202 to 205) (process of S508 shown in FIG. 508).

As described above, in FIG. 2, for example, the position of the still-image cursor 210 at the image 202 corresponds to the still image 220, and the still-image cursor 212 corresponds to the still image 222. For determination of the positions of the still-image cursors 210 to 212, the still images preferably have characteristics of the image 202. As such, the image-display unit 113 determines the positions, as described below.

First, one method relates to an audio-mode switching position. Conventionally, for example, an image is broadcasted using a stereophonic type as an audio mode for a CM (commercial-message) interval while the image is broadcasted in, for example, a monophonic mode and/or a bilingual mode as an audio mode for a main image (program broadcast). In this case, since also the difference between the audio modes is recorded onto the storage medium 105, a position immediately before or immediately after a portion (portion in the image) where the audio modes switch from one another is determined as a still-image-cursor position.

Another method is to recognize changes in scene in the image 202. For example, Japanese Patent Publication No. 10/276388 discloses a technique in which an image-classification-information detecting process is executed for extraction. Specifically, brightness values Y of images in a frame are summed up to obtain a sum S(Y), and a correlation C with that of the previous frame is obtained. Then, the correlation C is compared to a threshold to thereby determine a change in scene. However, since the technique of recognizing the change in scene is not directly related to the objects of the present invention. A further description thereof will be omitted hereform.

Still alternatively, user-predetermined positions may be determined as image-cursor positions. For example, when a user once views the image 202, the user depresses a predetermined button, such as a STILL IMAGE 403, of the remote controller at a desired portion. In response, the position information of the image is sent to the image-display unit 113, and the position of the image (scene) is stored.

As described above, when the position of the still-image cursor is efficiently selected, a characteristic still image representing the corresponding image can be displayed. This enables the selection of an image position having a high probability at which the user has an interest (the user is desirous of viewing), thereby enabling a user operability to be improved. For the determining method of still-image positions, the arrangement may be made to permit the user to select any method. Alternatively, the arrangement may be made such that the record and playback apparatus 101 automatically uses an appropriate method.

FIG. 3 shows an example in which display objects including the above-described scales, playback indicators, still-image cursors, and still images are presented on a display 301 (an example of the display unit 110). A left-end field of the display 301 displays the individual display objects shown in FIG. 2 in the form of, for example, a graph formed by stacking the scales. As a matter of course, however, the display field need not be positioned in the left-end portion, and it may be positioned in, for example, a right-end portion. Still alternatively, the display field may be positioned in a lower-end portion to display a graph formed by horizontally stacking the scales. Still alternatively, an independent window may be provided to display the objects. In this case, the stack-type graph may be replaced with, for example, a pie chart.

After the individual displayed objects are displayed, the system becomes ready to accept an input of the user through an indicator selection and execution unit 116 for the displayed objects. Specifically, the user sends a command to the input control unit 106 by, for example, using keys of the remote controller 401 or touching a panel of the display portion 404 of the remote controller 401. The command is issued primarily using cursor keys 405. First, suppose a focus is selectively placed on the playback indicator 208 among the display objects. The word "focus" is used to mean that the displayed object on which the "focus" is placed is targeted for the user operation is in a selected state.

In the state where the focus is placed on the playback indicator 208, when, for example, "RIGHT" among the cursor keys 405 is depressed, a signal representing "RIGHT" is sent to the indicator selection and execution unit 116, which constitutes the GUI control unit 107, via the input control unit 106 and the system control unit 102.

After the indicator selection and execution unit 116 has recognized the signal representing the above-mentioned "RIGHT", it internally shifts the above-mentioned focus to the still-image cursor 210. The indicator-selection-and-execution unit 116 manages, for example, the positions (coordinates) of the individual display objects on the screen, and thereby determines the selection of the display object targeted for shifting the focus. That is, in the present example case, the focus shifts to the still-image cursor 210 positioned in the right-side vicinity of the playback indicator 208.

To manage the display object as a target for focus, the indicator-selection-and-execution unit 116 selects the still-image cursor 210 (802) in a focus 803 in, for example, a selective execution table 801 shown in FIG. 8. The selective execution table 801 is stored in the indicator-selection-and-execution unit 116. The selection is performed to internally manage the display object on which the current focus is placed.

In addition, in order to display the focus for the user so as to exist on the still-image cursor 210, a command is issued to the display unit 110 via the system control unit 102 and the AV output control unit 108 to update the display to a state indicating that the still-image cursor 210 is selected. Thereby, the state is set in which the still-image cursor 210 is selected also on the display. In the state where the still-image cursor 210 is selected, the still image 220 corresponding to the still-image cursor 210 may be displayed on the right of the display shown in FIG. 3, that is, on the field 302 that is used to display played-back images of broadcasts.

Subsequently, when "DOWN" of the cursor key 405 is depressed in the above-described state, the focus shifts sequentially to the still-image cursors 211, 212, and 213 internally and on the display. The shift processes are similar to those described above.

Subsequently, in the state where the focus is placed on one of the still-image cursors 210 to 218 (the still-image cursor 210 in the present example case), the user is assumed to have depressed the PLAYBACK 402. In this case, according to the currently selected focus position (the still-image cursor 210 (802) in the present example case) and a PLAYBACK 804 corresponding to the PLAYBACK 402 depressed by the user, the indicator-selection-and-execution unit 116 sends the process contents stored (described) in an area 805 to the system control unit 102. In the present example case, for example, the contents of a "PERFORM PLAYBACK FROM POSITION OF STILL-IMAGE CURSOR 210" process are sent.

When the above-mentioned contents of the process are received by the system control unit 102, an image in the position corresponding to a still-image cursor on which the focus exists is read out from the storage medium 105 via the playback control unit 104, and is then appropriately displayed, that is, played back on the display unit 110.

In addition, the process described in process contents 808 is executed based on each of the display objects 806 selected in the focus position 803 in the selective execution table 801 and an item 807 corresponding to the signal input from, for example, the remote controller, via the input control unit 106. The same procedure is executed for other processes.

The focus-shifting method may be such that when "DOWN" among the cursor keys 405 is depressed in the state where the focus is placed on the playback indicator 208, the playback indicator 208 shifts to a first position 209 of the next image 203. Alternatively, the method may be such that when "DOWN" of the remote controller 401 is continually depressed, the playback indicator 208 finely shifts downward, allowing the user-desired playback position to be finely adjusted.

In a manner similar to the above, when the user depresses the PLAYBACK 402 in the state where the playback indicator 208 is selected, an image corresponding to the position is played back. Upon the playback of the above-mentioned image, the playback indicator control unit 112 shifts the playback indicator 208 to portions indicating the playback positions within the scale. According to the shift, the user can easily recognize the position of the current playback image in the overall images.

In addition, the arrangement may be made such that numbers are displayed with the images 220 to 228 individually. In this case, numerical keys 407 are used to input the number corresponding to each of the still images either to select the still image or to perform playback from the position of the still image.

As described above, the arrangement is made to enable the user to visually and directly input commands via the indicator selection and execution unit 116 for the above-described scales, playback indicator 208, still-image cursors, and still images. This enables the provision of a user interface having a higher operability. With the interface, for example, the selection of a desired playback image or playback position can be instantaneously performed. This is significantly effective as a unit of solving problems with conventional record and playback apparatuses of which environment in the mainstream in which input operation cannot be easily performed; and since many buttons exist, functions of the individual buttons cannot easily be identified; that is, a remote controller of which input functions are poor is used.

In addition, the constitution is made such that video signals are sent from the AV output control unit 108 to the remote controller 401. With the constitution, the user can perform operation while viewing display objects 410, which correspond to those shown in FIG. 4, displayed on the display portion 404 of the remote controller 401. In addition, since the above-described constitution enables only images to be displayed on the display unit 110, a wide display filed can be used. Moreover, using a touchpanel method for the display portion 404 of the remote controller 401 facilitates the shift of the focus, thereby enabling a user interface having an even higher operability to be provided.

Moreover, the constitution may be such that, for example, a subdisplay, which is different from the display, is provided, and the AV output control unit 108 sends video signals of the display objects to the subdisplay. In this case, only playback images can be exclusively displayed on the display.

Furthermore, in the first embodiment, while the quantitative display unit performs display on the basis of the image record time (playback time), the scale may be formed on the basis of the record size when necessary.

In the above case, the quantitative display unit 111 retrieves the data size of each image recorded in the storage medium 105. Alternatively, the quantitative display unit 111 calculates the record size of each image from multiplying the number representing a recording mode (such as 1, or 2) by the record time. According to the method in which the scale is created on the basis of the record size, the ratio in use space of each image in the storage medium can be instantaneously recognized when a specific record size needs to be secured. As such, the user can provide information that is easy to understand when determining an image to be erased depending on the record size.

Figure 10:
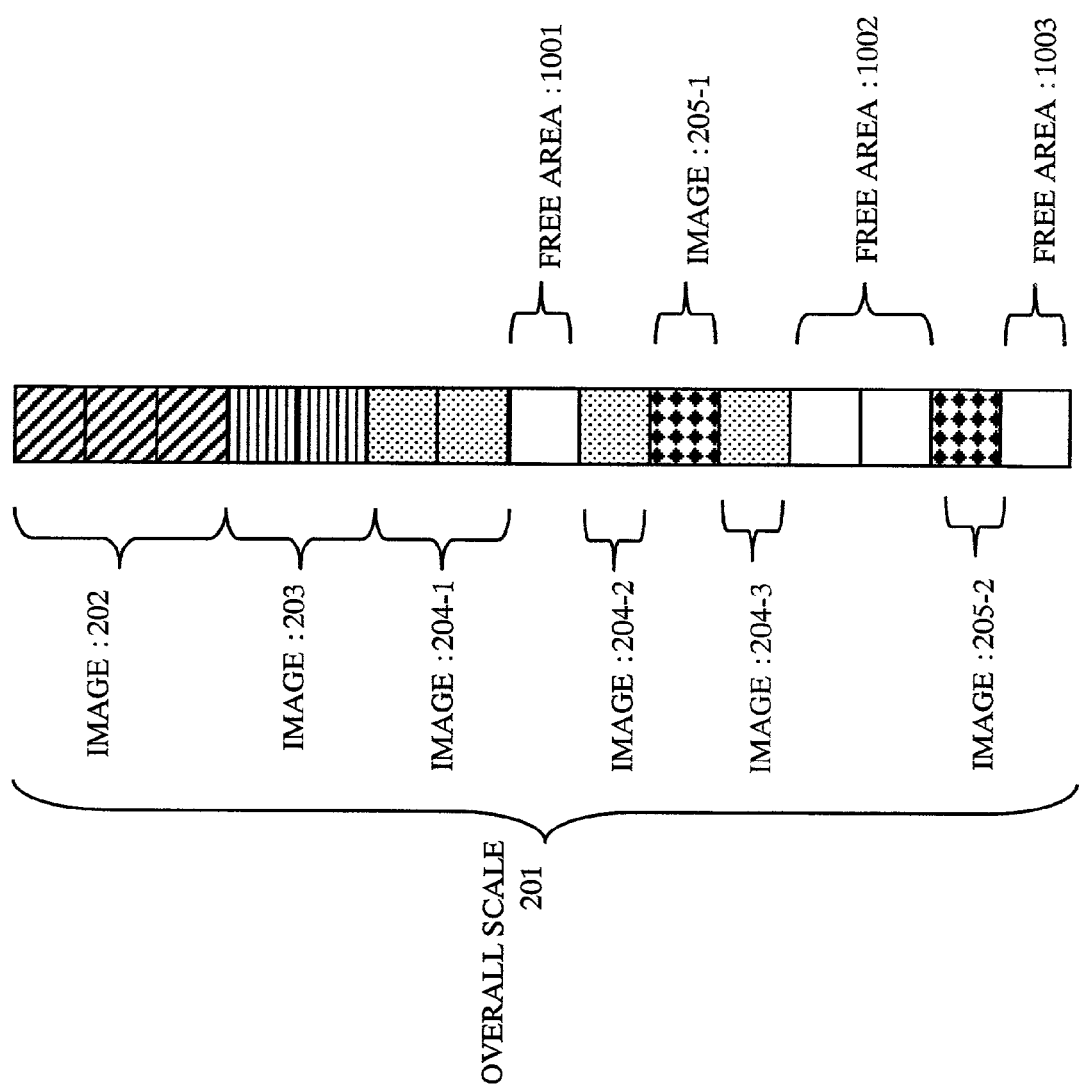
FIG. 10 shows an example of a display using a record site by the record and playback apparatus.

Still furthermore, information with timing that solves fragmentation of the storage medium can be provided to the user by displaying recorded portions of images in the storage medium at a high fidelity in the form of the scale. FIG. 10 shows an example case in which a quantitative display presented by the record and playback apparatus is modified to a display using recorded portions.

In the example case, it can be known that while no fragmentation has occurred in the images 202 and 203, the image 204 shown in FIG. 2 is fragmented into images 204-1 to 204-3. Also, it can be known that the image 205 shown in FIG. 2 is fragmented into images 205-1 and 205-2, and free areas 1001 to 1003 are each segmented.

The quantitative display unit 111 may be provided with a function that switchably displays scales using the record times, the record sizes, and the recorded portions in response to a command issued by the user. The switchable display function enables the user to obtain a display corresponding to an intended object.

Second Embodiment

In the first embodiment, the processes for playback performed with the record and playback apparatus 101 have mainly been described. In a second embodiment, processes for recording will mainly be described. Basic signal transferring and receiving in the record and playback apparatus 101 are performed in the same manner as that in the first embodiment. As such, hereinbelow, only necessary matters will be described.

Figure 7:
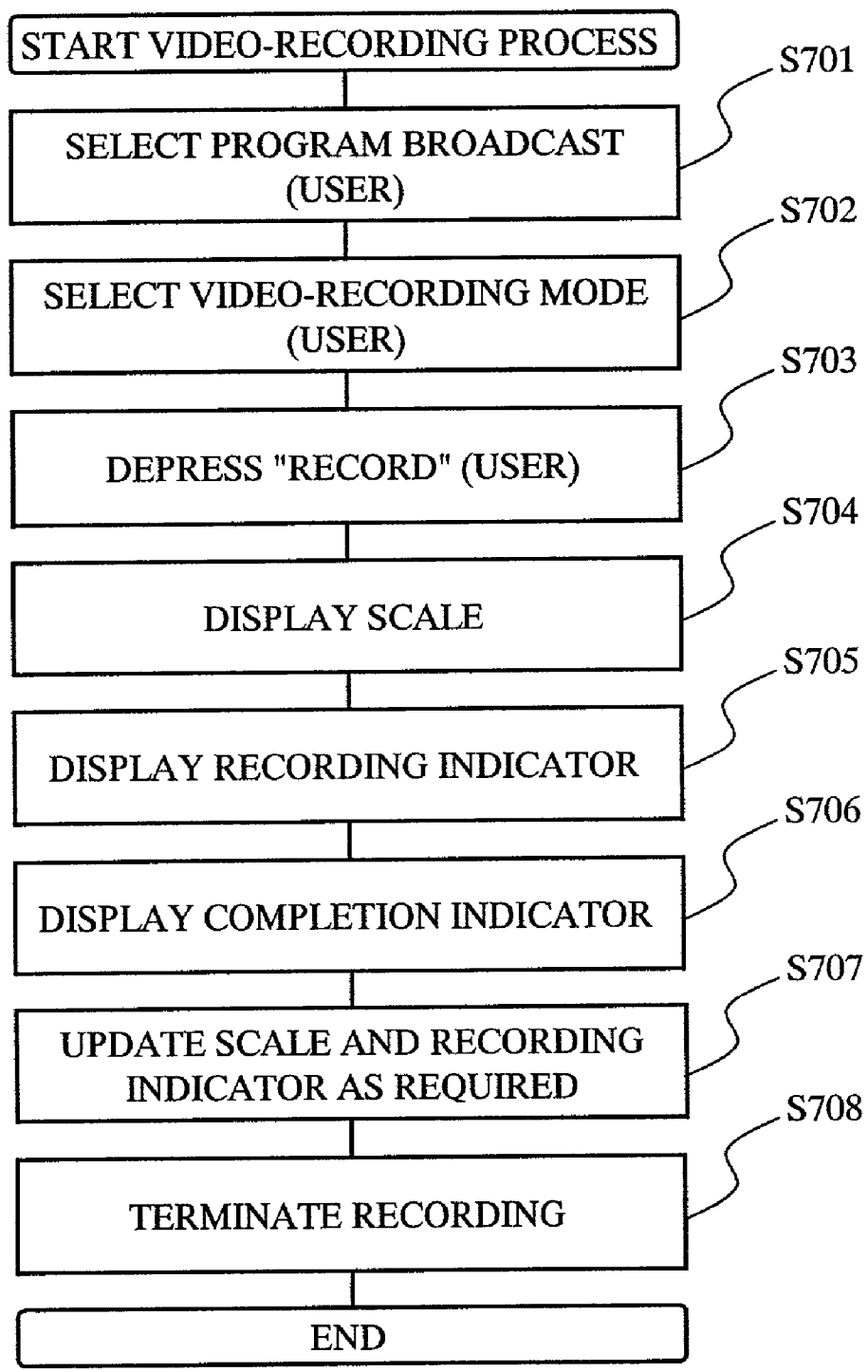
FIG. 7 is a flow chart showing processes at recording in the GUI control unit.

To perform playback of a desired image (program broadcast), the user operates the remote controller 401 and thereby selects an image (program broadcast) received by the reception unit 109 (S701 in FIG. 7). Since the above is the same as an operation performed with a tuner of a conventional TV set, a detailed description thereof will be omitted herefrom.

Subsequently, the user depresses, for example, MENU 409 of the remote controller 401, to display a plurality of video-recording modes, and then selects a desired one of the video-recording modes (S702 in FIG. 7). The information corresponding to the video-recording mode is sent to a record indicator control unit 114 constituting the indicator control unit 120, and is stored therein. In addition, the user depresses RECORD 408 of the remote controller 401 to thereby send a video-record command for the currently selected image (program broadcast) to the record and playback apparatus 101 (S703 in FIG. 7). The GUI control unit 107 receives the video-record command, and the quantitative display unit 111 displays the overall scale 201, which has been described in the first embodiment, on the display unit 110 (S704 in FIG. 7).

The remaining recordable time 206 represented by the overall scale 201 shown in FIG. 2 is displayed as a result of recalculation performed on the video-recording mode selected by the user, For example, the remaining recordable time 206 described with reference to FIG. 2 represents 80 minutes. Accordingly, when a triple mode is assumed to have been selected in the second embodiment, 240-miniute video-recording is possible.

For recording, the objects such as the playback indicator 208, the still-image cursors 210 to 218, and the images 220 to 228 need not be displayed. Also, the scales corresponding to the other images 202 to 205 need not be displayed.

Figure 6A:
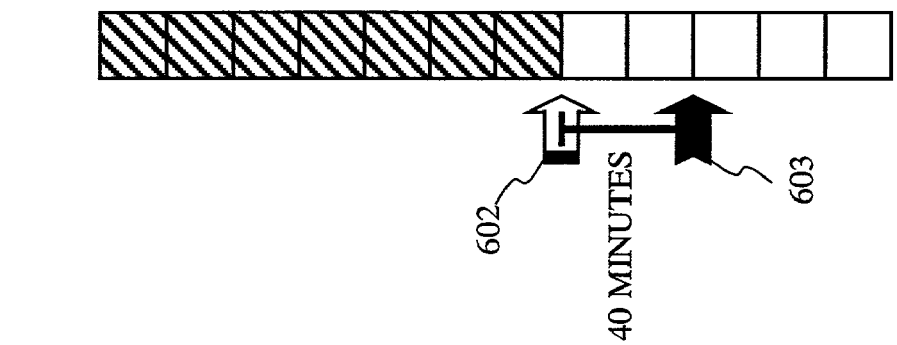
FIG. 6 shows an example of a quantitative display at image-recording and time slip playback.

FIG. 6A shows an example display when the remaining recordable time 206 in FIG. 2 is set to 240 minutes corresponding to the above-mentioned selected video-recording mode. In the state shown in FIG. 6A, since recording has not yet started, all the rectangular blocks are in unrecorded states.

A scale 601 is displayed according to the quantitative display unit 111. Subsequently, a record indicator 602 is displayed according to the record indicator control unit 114. The record indicator 602 is displayed at a top portion of the scale 601. Similar to the playback indicator 208 described above, in the progress with recording, the record indicator control unit 114 shifts the above-mentioned record indicator 602 downwardly of the scale 601 corresponding to the time of an already recorded image.

Subsequent to the display of the record indicator 602, the end indicator control unit 115 controls an end indicator 603 to be displayed in a position corresponding to end time of the image (program broadcast) currently in the process of video-recording (S706 in FIG. 7). The end indicator 603 is displayed in cases, for example, where video-recording time is reserved by the user, where information regarding broadcast-end time is available in an image (program broadcast) and where the record and playback apparatus 101 can obtain end time from an EPG (electronic program guide). In the example shown in FIG. 6A, one of the rectangular blocks represents 20 minutes, and the display is presented when video-recording for a 180-minute image (program broadcast) starts.

Figure 6B:
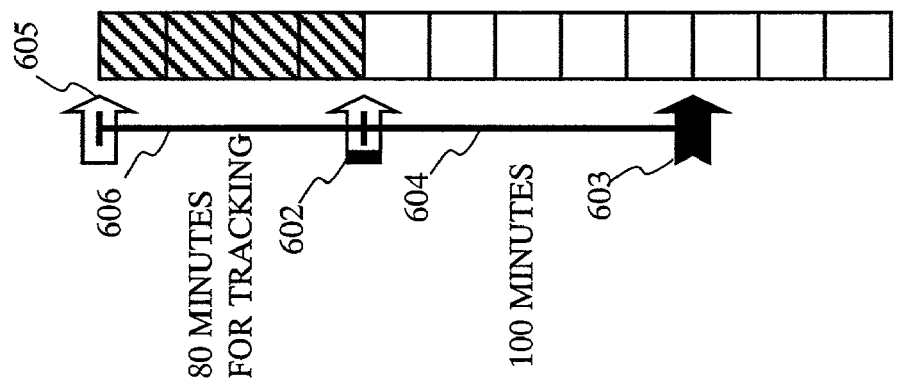

Subsequently, as recording of the image (program broadcast) progresses, the record indicator 602 shifts down as shown in FIG. 6B, and a pattern or a color is displayed in rectangular blocks representing the image already recorded, thereby indicating the end in recording (S707 in FIG. 7). The display is updated by the record indicator control unit 114 and the quantitative display unit 111.

When the position of the record indicator 602 accords with the position of the end indicator 603, that is, when the image (program broadcast) is completed, recording of the image (program broadcast) is completed (S708 in FIG. 7). In this case, the arrangement may be made such that the record indicator 602 disappears at the time of end.

As described above, the recorded state of the image (program broadcast) is visually represented using the scale 601, the record indicator 602, and the end indicator. Thereby, the user can instantaneously recognize information regarding the recording-progressed extent as well as a time (minutes, for example) required for the end of recording a remaining image portion. Moreover, displaying the end indicator enables the user to easily know a remaining video-recordable time.

To cause a more precise time required for the end of recording to be displayed, the record indicator control unit 114 may be provided with a function of controlling a time interval between the end indicator 603 and a record indicator 602 to be displayed by additionally using a numeric value as shown with a gauge 604.

Third Embodiment

Hereinbelow, a third embodiment will be described. In the fourth embodiment, a description will be made regarding processes for time slip playback that is performed with a storage medium capable of random accessing.

For example, suppose a user has started video-recording of a baseball program (image), and the video-recording has partially completed. In this state, a case can occur in which the user uses a time slip playback function to view the baseball program from the beginning. That is, in the state where the baseball program (image) is recorded by the record and playback apparatus 101, the user performs playback of the recorded baseball program from the beginning. However, in playback at a normal speed, no way can be considered for catching up with the record before the baseball program is completed. In such a case, as a conventional method of, for example, "double-speed playback" or "triple-speed playback" can be used to catch up with the baseball program (image) currently being recorded.

Figure 6C:
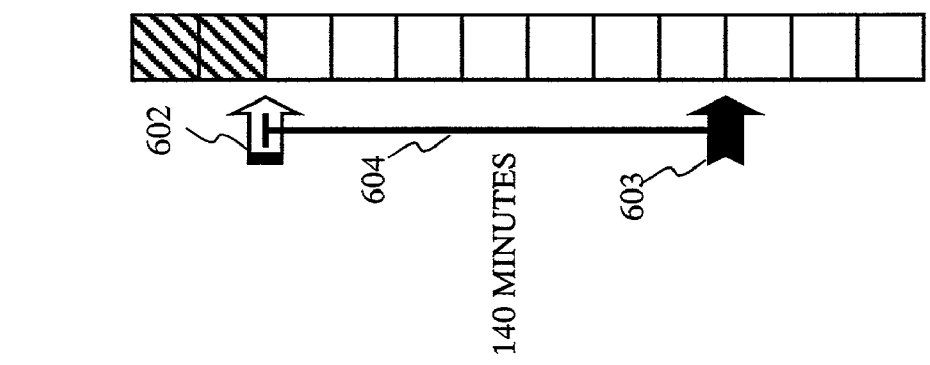

In the quantitative display shown in, for example, FIG. 6C, the above-described time slip playback method can be implemented in such a simply manner as that the top portion of the scale is selected, and playback is started as described in the first embodiment. In this particular example, the playback method such as the above-mentioned "double-speed playback" is assumed to be selectable through, for example, depression of the MENU 409 of the remote controller 401.

Upon start of time slip playback in the above-described playback process, similar to the case described in the first embodiment, the playback indicator control unit 112 controls a playback indicator 605 to be displayed at a top portion of the scale 601 and to shift down in the progress with playback.

Figure 6D:
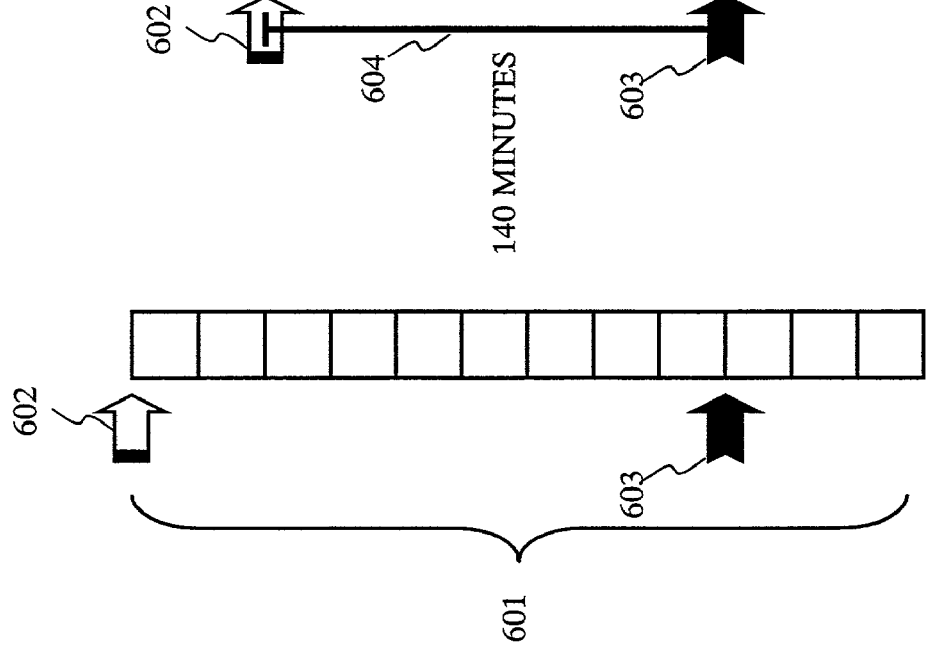

When the playback indicator 605 has caught up with the record indicator 602, the playback indicator 605 disappears, and only the record indicator 602 and end indicator 603 remain, as shown in FIG. 6D. In this state, the image (program broadcast) currently being recorded is displayed on the display unit 110.

According to the above, the scale 601, the record indicator 602, and the playback indicator 605 are displayed on the display unit 110. Thereby, the user can visually recognize all the processes of the display unit 110 with respect to the current storage medium.

In addition, at the time of time slip playback, the playback indicator control unit 112 controls a tracking gauge 606 connecting the record indicator 602 and the playback indicator 605 to be displayed. The playback indicator 605 represents the time required for the playback indicator 605 to catch up with the record indicator 602. The time can be calculated according to the following expression (Expression 1) using parameters such as the playback speed and the individual indicator positions (times passed after the start of recording):

(record indicator position−playback indicator position)/(playback speed−recording speed)     (Expression 1)

The present embodiment described above exhibits advantages, particularly with the tracking gauge, as described below.

In the time slip playback, dissimilar to the above-described gauge 604, the number of the rectangular blocks in the scale does not represent the time for catching up with the record indicator 602. Specifically, in FIG. 6C, the value represented by the rectangular blocks between the playback indicator 605 and the record indicator 602 is 80 minutes. However, when playback is performed in the triple-speed mode, the playback indicator 605 catches up with the record indicator 602 after 40 minutes has passed. That is, in time slip playback, information indicating the time required for the playback indicator 605 to catch up with the record indicator 602 is not displayed with the scale. As such, to know a time necessary to catch up with the baseball program (image) currently being broadcasted, the user needs to calculate the playback speed by using, for example, the time passed after the start of recording. However, since the calculation is not so easy to be performed by mental operations, the user can only recognize the time at a precision of, for example, "more about X minutes". With the tracking gauge 606 being displayed, the user is enabled to precisely recognize the time required for the playback indicator 605 to catch up with the record indicator 602.

In the above, the arrangement may be made such that, for example, "Catch up one hour later", is set through the remote controller 401; and the playback control unit 104 calculates (calculates back) an appropriate playback speed and controls playback to be performed at the calculated playback speed.

Fourth Embodiment

Hereinbelow, a fourth embodiment will be described. In the fourth embodiment, a description will be made regarding processes for a jump indicator provided to facilitate the selection of a predetermined image.

Figure 9:
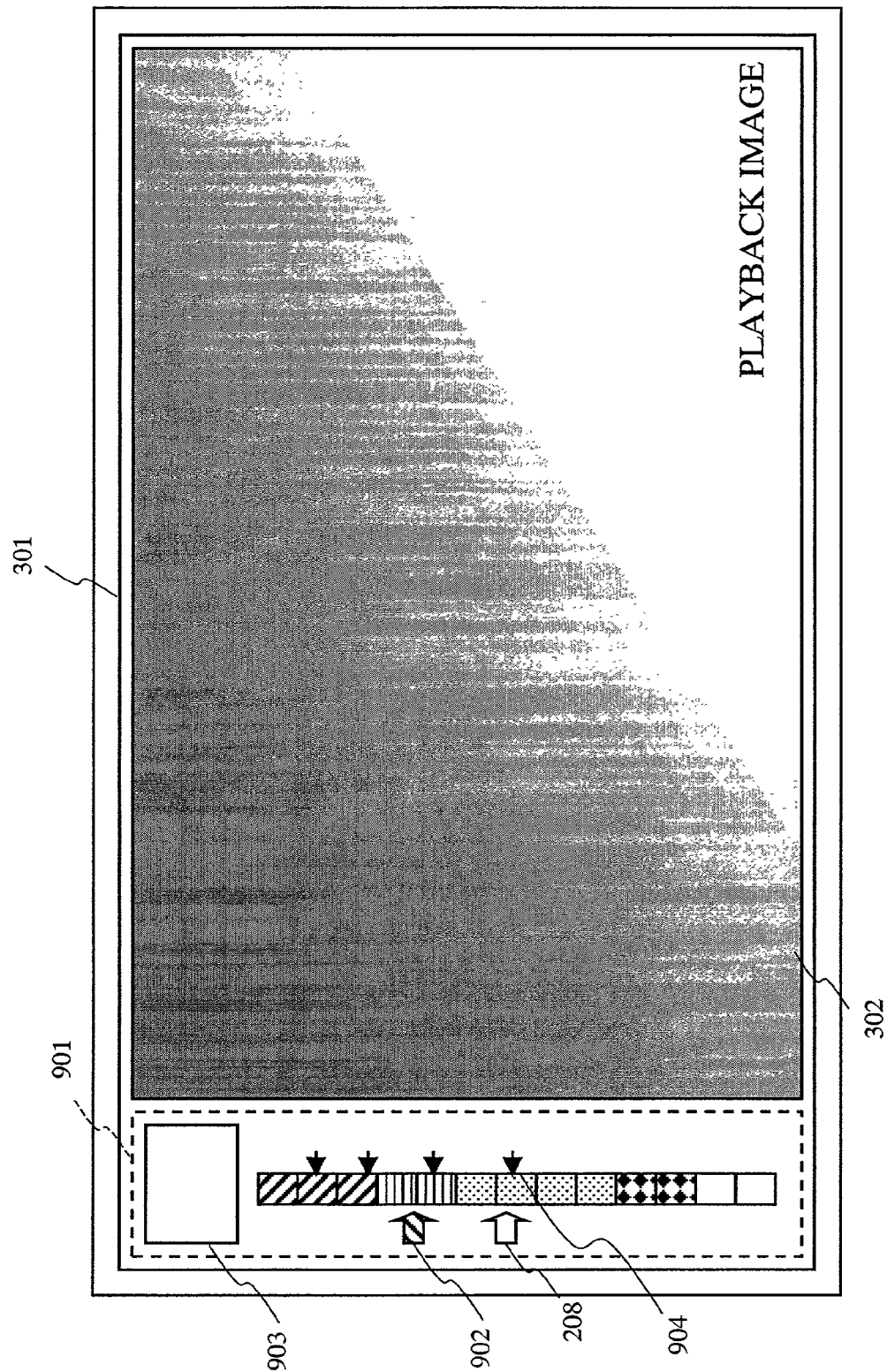
FIG. 9 shows an imaginary view when an jump indicator is displayed.

FIG. 9 shows an example of the field 302 of the display 301 that is provided to display a playback image of a broadcast program or the like, and an example display of display objects 901. The display objects 901 include the display objects shown in the individual embodiments 1 to 3, and in addition, a jump indicator 902.

The jump indicator 902 is controlled by the jump indicator control unit 117 shown in FIG. 1. The displaying method, the selection method, and the like for the jump indicator 902 are the same as those for each of the indicators shown in the embodiments 1 to 3. As such, descriptions thereof will be omitted herefrom, and only unique processes regarding the jump indicator 902 will be described.

The jump indicator 902 is functionally similar to the playback indicator 208. However, while the playback indicator 208 indicates the position of an in-playing back image, the jump indicator 902 can be operated independently of the in-playing back image. Specifically, for example, when the user shifts the playback indicator 208 via the remote controller, also the field 302 displays the image corresponding to the position indicated by the playback indicator 208. However, the image being displayed is not adversely influenced even when the jump indicator 902 is shifted.

As such, the jump indicator 902 is used in a case where, when an image currently being played back (recorded) is displayed in the field 302, for example, the user wants to select a desired scene from a plurality of other already-recorded images with the above-mentioned display being kept as it is.

Hereinbelow, processes to be performed by the jump indicator control unit 117 will be described. In the description, the jump indicator 902 is assumed to have been preliminarily displayed on the display objects 901.

First, the user places a focus on the jump indicator 902 by using, for example, the cursor keys 405. Subsequently, when the user moves the jump indicator 902 by using the cursor keys 405, an image corresponding to a portion to which the jump indicator 902 has been shifted is read out from the storage medium 105 via the playback control unit 104. Then, the image is output to the display unit 110 via the system control unit 102 and the AV output control unit 108. However, the image corresponding to the position of the jump indicator 902 is displayed as a motion image or a still image on the predetermined field 903 (subscreen). And, the image currently being played back (recorded) is displayed on the field 302.

Subsequently, when the user wants to perform playback from a portion corresponding to the portion at which the jump indicator 902 is positioned, the user depresses the PLAYBACK 402 of the remote controller 401 in the state where the focus is placed on the jump indicator 902.

The depression of the above PLAYBACK 402 is informed to the indicator selection and execution unit 116 via the input control unit 106 and the system control unit 102. From the jump indicator control unit 117, the indicator selection and execution unit 116 retrieves information on the current position of the current jump indicator 902.

The indicator selection and execution unit 116, which has retrieved the information on the position of the jump indicator 902, sends to the system control unit 102 a report of starting playback of the corresponding image from the above-mentioned position. Concurrently, the indicator selection and execution unit 116 notices to the playback indicator control unit 112 of a request to change the display position of the playback indicator 208.

After the system control unit 102 receives the playback-start request, the system control unit 102 retrieves the corresponding image from the storage medium via the playback control unit 104, and controls the image to be displayed on the field 302 of the display 301.

The playback indicator control unit 112 changes the display position of the playback indicator 208 to the position represented by the retrieved information.

As described above, the jump indicator is provided, and the image corresponding to the position indicated by the jump indicator is displayed at the position different from the display position corresponding to the playback indicator 208. This enables the user to select a different image with the in-playing back image being kept as it is.

The jump indicator may be controlled to automatically shift in association with the playback indicator or the record indicator.

In the above case, when necessary, the jump indicator control unit 117 obtains the information representing the position of each of the playback indicator and the record indicator, and controls the jump indicator to shift to the vicinity of each indicator. The vicinity of the indicator is, for example, a position corresponding to a several-second-previous position of the in-playing back image.

According to the above arrangement, when a user wants to re-view the same scene during playback of, for example, a sports-cast image, the user can instantaneously perform playback of the desired image by selecting the jump indicator. The position of the jump indicator to be shifted in association with the other indicator may be optionally determined by the user.

As described above, the arrangement is made such that a command can be inputted for the jump indicator in addition to commands for the playback indicator and the record indicator. Consequently, for example, the selection of a desired playback image or playback position can be instantaneously implemented without adversely influencing a display that is currently being played back (recorded).

Since the scale representing each image is created using the playback time, the user can instantaneously and visually recognize the playback time of each image upon seeing the scale.

In addition, commands can be visually and directly inputted for the display objects such as the scale, the playback indicator, the record indicator, the still images, and the jump indicator. This enables the provision of the user interface that enables, for example, a desired playback image or playback position to be instantaneously selected and that has a higher operation.

Furthermore, the user can visually (perceptually) and instantaneously recognize the number of images already recorded on the storage medium, the playback time, the remaining recordable time, and the position of the previously played back image.

Still furthermore, since the still-image cursor and the still image are displayed at the position corresponding to each image (scale), the user can easily know the contents of a scene at a predetermined position of each image.

Yet furthermore, since the position of the still-image cursor can be efficiently selected, a characteristic still image representing the corresponding image can be displayed. This enables the selection of an image position having a high probability at which the user has an interest (the user is desirous of viewing), thereby enabling the user operation property to be improved.

What is claimed is:

1. A record and playback apparatus for recording and playing back an image by using a storage medium capable of random accessing, comprising:
   quantitative display means of visually quantitative displaying a record time of a record-completed image recorded in the storage medium and the remaining recordable time;
   indicator control means of displaying at least one of a playback indicator indicating a playback position in the quantitative display of an in-playing back image or a record indicator indicating a record position in the quantitative display of an in-recording image; and
   indicator selection and execution means of selecting at least one of the playback indicator, the record indicator and the quantitative display each of which is a display object, and of executing a predetermined process based on a predetermined command to be input and the display object to be selected; and
   further comprising an end indicator control means of displaying an end indicator indicating an end prospected position of the in-recording image in the quantitative display.

2. A record and playback apparatus for recording and playing back an image by using a storage medium capable of random accessing, comprising:
   quantitative display means of visually quantitative displaying a record time of a record-completed image recorded in the storage medium and the remaining recordable time;
   indicator control means of displaying at least one of a playback indicator indicating a playback position in the quantitative display of an in-playing back image or a record indicator indicating a record position in the quantitative display of an in-recording image; and
   indicator selection and execution means of selecting at least one of the playback indicator, the record indicator and the quantitative display each of which is a display object, and of executing a predetermined process based on a predetermined command to be input and the display object to be selected; and
   wherein the quantitative display means quantitative displays the record-completed image based on one of a playback time, a record capacity and a record site.

3. A record and playback apparatus for recording and playing back an image by using a storage medium capable of random accessing, comprising:
   quantitative display means of visually quantitative displaying a record time of a record-completed image recorded in the storage medium and the remaining recordable time;
   indicator control means of displaying at least one of a playback indicator indicating a playback position in the quantitative display of an in-playing back image or a record indicator indicating a record position in the quantitative display of an in-recording image; and
   indicator selection and execution means of selecting at least one of the playback indicator, the record indicator and the quantitative display each of which is a display object, and of executing a predetermined process based on a predetermined command to be input and the display object to be selected; and
   wherein the quantitative display means switches and displays at least two or more quantitative displays based on the playback time, record capacity and record site of the record-completed image.

4. A record and playback apparatus for recording and playing back an image by using a storage medium capable of random accessing, comprising:
   quantitative display means of visually quantitative displaying a record time of a record-completed image recorded in the storage medium and the remaining recordable time;
   indicator control means of displaying at least one of a playback indicator indicating a playback position in the quantitative display of an in-playing back image or a record indicator indicating a record position in the quantitative display of an in-recording image; and
   indicator selection and execution means of selecting at least one of the playback indicator, the record indicator and the quantitative display each of which is a display object, and of executing a predetermined process based on a predetermined command to be input and the display object to be selected; and
   wherein the remaining recordable time is a remaining record time until the end of recording of the in-record image.

5. The record and playback apparatus according to one of claims 1, 2, 3, and 4, comprising a jump indicator control means displaying a jump indicator indicating a predetermined position of the record-completed image on the quantitative display, in addition to the playback indicator, wherein
   the jump indicator constitutes of the display object which is subjected to a process by the indicator selection and execution means.

6. The record and playback means according to claim 5, wherein the jump indicator can optionally select the quantitative display based on the predetermined input.

7. The record and playback apparatus according to claim 5, wherein the jump indicator moves by interlocking with the playback indicator or the record indicator.

8. The record and playback apparatus according to claim 5, wherein the jump indicator interlocks and moves at a position before the predetermined time of a position indicated by the playback indicator or the record indicator.

9. A computer readable record medium which records a program allowing a record and playback apparatus for recording and playing back an image by a storage medium capable of random accessing to execute the steps of:
  a display step of displaying visualized quantitative displays of a record time of a record-completed image recorded in the storage medium and the remaining recordable time, and of displaying at least one of a playback indicator indicating a playback position in the quantitative display of the in-playing back image and a record indicator step of indicating a record position in the quantitative display of the in-recording image; and
  an indicator selection and execution step of selecting at least one of the playback indicator, the record indicator and the quantitative display each of which is a display object, and executing a predetermined process bases on a predetermined command to be inputted and the display object to be selected; and
  a display step an end indicator indicating an end prospected position of the in-recording image in the quantitative display.

10. A computer readable record medium which records a program allowing a record and playback apparatus for recording and playing back an image by a storage medium capable of random accessing to execute the steps of:
  visually quantitative displaying a record time of a record-completed image recorded in the storage medium and the remaining recordable time;
  displaying at least one of a playback indicator indicating a playback position in the quantitative display of an in-playing back image or a record indicator indicating a record position in the quantitative display of an in-recording image; and
  selecting at least one of the playback indicator, the record indicator and the quantitative display each of which is a display object, and executing a predetermined process based on a predetermined command to be input and the display object to be selected;
  wherein the step of visually quantitative displaying comprises displaying the record-completed image based on one of a playback time, a record capacity and a record site.

11. A computer readable record medium which records a program allowing a record and playback apparatus for recording and playing back an image by a storage medium capable of random accessing to execute the steps of:
  visually quantitative displaying a record time of a record-completed image recorded in the storage medium and the remaining recordable time;
  indicating a playback position in the quantitative display of an in-playing back image or a record indicator indicating a record position in the quantitative display of an in-recording image; and
  selecting at least one of the playback indicator, the record indicator and the quantitative display each of which is a display object, and executing a predetermined process based on a predetermined command to be input and the display object to be selected;
  wherein the step of visually quantitative displaying comprises switching and displaying at least two or more quantitative displays based on the playback time, record capacity and record site of the record-completed image.

* * * * *

UNITED STATES PATENT AND TRADEMARK OFFICE
CERTIFICATE OF CORRECTION

PATENT NO.       : 7,177,531 B2                                            Page 1 of 1
APPLICATION NO.  : 10/001195
DATED            : October 2, 2008
INVENTOR(S)      : Masahiro Horie et al.

It is certified that error appears in the above-identified patent and that said Letters Patent is hereby corrected as shown below:

Title Page, Under section "(56) References Cited, FOREIGN PATENT DOCUMENTS", delete "JP 08-223524 08/1998"

Column 19, line 19, delete "and"

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,177,531 B2 | Page 1 of 1 |
| APPLICATION NO. | : 10/001195 | |
| DATED | : February 13, 2007 | |
| INVENTOR(S) | : Masahiro Horie et al. | |

It is certified that error appears in the above-identified patent and that said Letters Patent is hereby corrected as shown below:

Title Page, Under section "(56) References Cited, FOREIGN PATENT DOCUMENTS", delete "JP 08-223524 08/1998"

Column 19, line 19, delete "and"

This certificate supersedes the Certificate of Correction issued November 11, 2008.

Signed and Sealed this

Ninth Day of December, 2008

JON W. DUDAS
*Director of the United States Patent and Trademark Office*